June 28, 1960 R. H. WESTFALL 2,943,088
PRODUCTION OF CYANURIC ACID FROM UREA
Filed June 22, 1959 3 Sheets-Sheet 1

FIG. 1

INVENTOR.
RICHARD HOWARD WESTFALL
BY Milton Zucker

ATTORNEYS.

June 28, 1960 R. H. WESTFALL 2,943,088
PRODUCTION OF CYANURIC ACID FROM UREA
Filed June 22, 1959 3 Sheets-Sheet 3

INVENTOR.
RICHARD HOWARD WESTFALL
BY
ATTORNEY

# 2,943,088

PRODUCTION OF CYANURIC ACID FROM UREA

Richard Howard Westfall, 141 Tudor Oval, Westfield, N.J.

Filed June 22, 1959, Ser. No. 822,066

14 Claims. (Cl. 260—248)

This invention relates to manufacture of cyanuric acid by the heat treatment of urea, and has as its principal object the provision of a method which will produce cyanuric acid in high yields, with minimum requirements for labor and operating costs, and in such relatively pure form that purification procedures are minimized.

Cyanuric acid, which is the desired end product of the present invention, has the empirical formula $C_3H_3O_3N_3$, being generally represented structurally either as or although the structure is probably an equilibrium between the various possible forms. It is one of the many products obtainable by the pyrolysis of urea, the equation being:

Unfortunately, this reaction does not occur alone. When urea is heated to temperatures above its melting point, it may also partially volatilize, isomerize to ammonium cyanate, and lose ammonia and/or water and/or carbon dioxide, to produce a range of products in addition to cyanuric acid. These products include amides of cyanuric acid—ammeline, ammelide and melamine-biuret, triuret, dicyandiamide, ammonium carbonate, cyanic acid and polymers thereof, and various other materials.

One major difficulty with pyrolyzing urea is the vast number of possible products, and the difficulty of controlling the reaction so as to minimize the production of undesired products, and obtaining the desired end product in good yield and in readily purifiable form. This is most important where the cyanuric acid is to be chlorinated, since it is essential, if satisfactory chlorinated cyanuric acids are to be obtained, that essentially pure cyanuric acid be used as the raw material. Hence, it is necessary to obtain a commercial product essentially free of other degradation products of urea.

Another major difficulty is that during the pyrolysis, urea goes through a series of physical changes, from solid to liquid to a plastic sticky mass and finally to a hard solid. This sequence of physical changes causes gumming, sticking and scaling troubles when attempts are made to pyrolyze urea on any commercial scale.

Thus, despite the low cost of urea, and the obvious economies of a simple pyrolysis process, the commercial preparation of the various possible products of urea pyrolysis has been accomplished by other means than simple pyrolysis. In the case of cyanuric acid, many other processes have been suggested, the commonly proposed ones involving the reaction of urea in the presence of addition agents which alter the sequence of physical states obtained on simple pyrolysis followed by separation of cyanuric acid from the addition agents.

It is an object of this invention to provide an improved method for the manufacture of cyanuric acid. A further object is to provide a process for the manufacture of crude cyanuric acid which is convertible by acid hydrolysis into commercially pure cyanuric acid, which process yields directly a free-flowing pelleted product.

A further object of the present invention is to provide a process for the pyrolysis of urea to cyanuric acid, which is characterized by the fact that urea is converted into cyanuric acid by heating above its melting point in such a manner that trouble-free operation with a minimum of operator attention is provided. It is another object of one form of the invention to operate with granules which are free-flowing and react uniformly, so that products of improved purity are obtained with minimum effort and cost. Another object is to improve the over-all yields, and to minimize ammelide formation, so that the cost of acid hydrolysis is reduced. Another object of the invention is to provide conditions which permit of continuous operation and economical recovery of urea values from the overhead gases. A further object of the invention is the provision of means to recover from the overhead gases urea values which are directly reusable in the process, without further treatment.

These and other objects are obtained, according to the present invention, by heating urea while continuously moving it, as by tumbling, so that it melts and deammoniates through a viscous plastic state into a hard solid state, under such conditions of agitation that the reaction product is in the form of small granules, whereby the reaction can readily be brought to conclusion without excessive decomposition and volatilization.

The reaction can be carried out with urea alone, in which case the urea is slowly heated to 240° to 360° C. while continuously tumbling the freely moving mass past a heat exchange surface supplying heat to the mass, at a speed of 50 to 1,000 lineal inches per minute, so that, as the urea melts and deammoniates, the reaction product slowly breaks itself up into small free-flowing granules of reaction product consisting largely of cyanuric acid and ammelide, with some ammeline and minor quantities of leachable impurities. Most preferably, the process is carried out continuously, mixing fresh urea with at least twice its weight of the free-flowing crude cyanuric acid granules obtained from the reaction, and feeding the mixture through a heated reaction zone, with a discharge temperature of 210° to 375° C., while continuously agitating the granules to preserve them in free-flowing form throughout the reaction zone; under such conditions, very rapid conversion into crude cyanuric acid is obtained, in unusually high yield.

The drawings herein illustrate the type of apparatus useful in producing the invention. In the drawings—

When working with urea alone, care must be taken to heat the urea rather slowly. Urea has a melting point of about 132° C. If heating is continued after melting, gases are evolved and the melt becomes increasingly viscous and eventually solidifies at a temperature of 200–300° C., depending largely on the rate of heating; if the heating is very slow, complete solidification may occur as low as 200° C., while with rapid heating the mass may remain fluid for a short time even at 300° C. Attempts to prepare cyanuric acid by heating urea in an ordinary stirred reaction kettle have been unsatisfactory. As the product thickens and solidifies, it adheres to the stirrer and kettle walls, the stirrer stops, and the product can only be removed with drill and chisel, or other similarly laborious means. Such product removal means are, of course, expensive and always involve a serious risk of injury to equipment and personnel. Furthermore, the caking of the reaction mass and the consequent difficulty in providing effective agitation also results in limited heat transfer, and controlled, uniform heating of the reaction mass is difficult, if not impossible.

Surprisingly, it has been found that the free tumbling action available in a slowly rotating rotary kiln heated to about 240–360° C., preferably about 280–340° C., is peculiarly suited for carrying out the thermal conversion of urea to cyanuric acid. The sequence of physical changes which occur during the conversion of urea to cyanuric acid are usuall in rotary kiln operation. As already disclosed, the crystalline urea melts to form a thin, mobile liquid which evolves gases and changes to a viscous plastic mass which eventually sets to a hard solid. One would expect that the sticky plastic mass would adhere to the kiln wall and solidify to form a hard coating which would be difficult to remove. Indeed, it has been found that under some operating conditions this does occur, and that even hammering on the kiln walls or tumbling steel rods, bars or I-beams inside the kiln does not prevent coating of the kiln walls with a scale which can be removed only with the greatest difficulty. On the other hand, under other operating conditions, the product is obtained in large chunks and balls ranging in size from about six inches up to about one foot or more in diameter. This results in handling and crushing problems, as well as lack of uniformity in cyanuric acid content due to poor heat transfer through the large chunks with consequent poor yields. Surprisingly, however, it has been found that when the kiln is operated under certain closely controlled conditions, the molten urea converts over the course of the reaction into a granular, free flowing product with a minimum of scaling on the kiln walls, and with no large lumps. The granular form of product not only ensures uniformity of reaction, but has the practical advantage of ease of handling and conveying, very little dusting, and no need for crushing as a preliminary to grinding.

Urea is charged into a rotary kiln and then, with the kiln rotating at such a rate as to result in a peripheral speed of between about 50 inches per minute and about 1,000 inches per minute, the kiln is heated, suitably by externally applied gas flames, until the temperature reaches a point between 240° C. and about 360° C. The kiln is then usually allowed to cool somewhat, although cooling is not essential, and the product is then removed in the form of granules or small lumps. The particle size of the product is apparently dependent upon such factors as heating rate and peripheral speed of rotation of the kiln. The maximum temperature reached by the kiln walls appears to have very little effect on the particle size, but does determine the extent to which product adheres to the kiln. The heating rate and peripheral speed of rotation which produce the preferred granular or pelletized product appear to be interrelated.

High peripheral speeds and high heating rates favor formation of large balls or lumps of product, while low heating rates and low peripheral speeds favor formation of pellet-form product. At low heating rates even high peripheral speeds result in pellet form products, and low peripheral speeds even at high heating rates do also, although under these conditions the resulting pellets tend to be a little larger. Under most conditions which favor formation of a pelletized kiln product, a small amount of cyanuric acid remains on the kiln walls as an adherent scale. This adheres tightly to the wall only when the maximum temperature is in the lower part of the operating range; the adhering tendency can usually be overcome by increasing the maximum kiln temperature, though raising the temperature increases the rate of volatilization of product, and this makes operation at temperatures above 360° C. generally undesirable.

In general, batch heating times of the order of 50 to 200 minutes are desirable in attaining the objects of the instant invention with normal commercial batches of 100 to 1,000 pounds. More rapid heating rates in kilns of any size will tend to cause lump formation; longer heating times tend to cause undue overhead losses, particularly at the higher operating temperatures which favor clean heat transfer surfaces.

The rotary kilns which can be used may vary widely in physical dimensions and in methods of heating. Essentially, such a kiln will comprise a heated, substantially cylindrical vessel adapted for rotation about its axis, which axis is either horizontal or slightly inclined from the horizontal enough to permit continuous gravity discharge of kiln contents after the necessary residence time in the kiln. There have been used for the practice of this invention kilns with diameters about equal to their length, and kilns with lengths four and a half times their diameters. An even greater ratio of length to diameter is sometimes useful, especially in continuous operation. The kiln and its contents are preferably heated by means of externally applied gas flames, but in some instances a minor portion of the necessary heating is supplied by passing either a flame or a current of pre-heated gases into the kiln itself.

Suitable baffles, dams, scrapers and hammers may be provided for batch or continuous kilns to improve the free tumbling of the reaction mass, regulate flow, and help control product particle size. As pointed out above, there is a relationship existing between peripheral speed, rate of heating, maximum wall temperature, and product form. It is preferred, of course, to obtain the product in pellets or small lumps. This may be accomplished even at relatively high peripheral speeds if the heating rate is low, but with a high heating rate, the peripheral speed must be low. At speeds of 500 lineal inches per minute or more, in kilns holding 100 pounds of urea, it is essential that at least an hour be taken to reach a typical top temperature of 280° C. to 300° C., if balling and lumping are to be avoided; at lower peripheral speeds, of the order of 250 inches per minute, somewhat faster heating may be used, while at higher speeds even slower heating is necessary.

It has been observed that the yield of cyanuric acid, particularly when operating at temperatures in the lower portion of the preferred temperature range, can be considerably enhanced by causing a slow current of an inert gas, such as nitrogen, flue gas, or the like, to pass through the kiln in which the urea is being converted to cyanuric acid, or by partially evacuating the kiln. Apparently this yield improvement results because the accumulation of substantial amounts of ammonia in the reaction zone, which favors formation of cyanuric amides, is thereby prevented.

The kiln produced cyanuric acid usually assays from about 60% to about 65% cyanuric acid, and appears to contain varying amounts of ammonia, and cogeners of cyanuric acid such as its amides, ammelide and ammeline. Care must be taken in assaying this crude cyanuric acid since, by ordinary alkalimetric methods, some of the cogeners of cyanuric acid behave like cyanuric acid and cause erroneously high analytical results. Thus, all analytical results reported in the literature without details of the analytical methods used are questionable.

In assaying cyanuric acid, correct results are not obtained unless interfering cogeners are removed prior to determination of the contained cyanuric acid. Even this removal is difficult to perform completely, and for greatest accuracy, the cogeners, such as ammelide, remaining during analysis must be taken into consideration. Instead of dissolving in hot standardized caustic soda solution, the crude acid is dissolved in water at room temperature and the very slightly soluble ammelide is filtered off. The aqueous filtrate contains all of the cyanuric acid and a small amount of ammelide. The total of these soluble substances is then determined titrimetrically. The ammelide in the aqueous solution is determined by ultraviolet absorption and the titrimetric results corrected to give a true measure of the cyanuric acid content of the product. If these precautions are not taken during assay, a typical crude product made by pyrolysis of urea, which actually contains 62% cyanuric acid, may be erroneously reported to contain as much as 81% cyanuric acid.

Higher conversion may be obtained, much more rapidly, by recycling a portion of the crude cyanuric acid granules, after mixing them with from about one-half to one-sixth of their weight of urea, and feeding the mixture through a heated reaction zone, with a discharge temperature of 210° C. to 375° C. while continuously agitating the granules to preserve them in free-flowing form throughout the reaction zone.

With such mixtures, there is, in general, a relationship between bed temperature and residence time in the reaction zone. At the upper temperature limit, the residence time should be held close to a minimum preferred time of about six minutes in order to minimize volatilization of product and of urea. In the lower part of the temperature range, substantially longer residence times may be used, but preferably residence times beyond 40 minutes should be avoided to minimize overhead losses.

The crude reaction products obtained contain 75% to 80% or more cyanuric acid, over 95% of cyanuric acid plus ammelide, and a very small amount of water soluble impurities, so that acid hydrolysis of the product to commercially pure cyanuric acid is a very simple and inexpensive operation. Furthermore, the over-all yield, based on urea consumed in the process, is about 90% of theoretical, and only a small amount of the urea is volatilized and needs to be recovered.

In this form of the process of this invention, the gases containing the volatilized urea flow at a relatively uniform rate, so that economical treatment to recover urea values should be possible. However, the composition of the gas stream is complex, comprising, in addition to urea and small amounts of cyanuric acid, biuret, ammonia, carbon dioxide, water, cyanic acid, and perhaps other constituents. Recovery of useful urea values from these complex vapors, in a form which can be readily and completely reused in the process of manufacturing cyanuric acid, is difficult. Recovery in a cold condenser would involve condensation of solids with attendant removal problems. In addition, on condensation in a cold condenser, the urea partially condenses as solid ammonium cyanate which can be converted back to useful urea values only in low yield and with considerable difficulty, and as ammonium carbamate or carbonate which cannot be reconverted to urea or to cyanuric acid and thus represents a loss of urea and cyanuric acid from the system. On the other hand, it has now been discovered that the apparent vapor pressure of urea increases rapidly above its melting point. Urea has an apparent vapor pressure of 28.0 mm. Hg at 130° C. It melts at 132° C., and the molten urea has apparent vapor pressures of 100 mm. Hg at 140° C., 273 mm. Hg at 150° C., and 619 mm. Hg at 159° C.

Thus, operation of a simple urea condensation system above the melting point of urea would entail serious losses of urea because of its high vapor pressure. According to this invention, the surprising discovery has been made that the urea values can be preferentially separated from the complex reactor gas mixture in very high yield and in a liquid form which can be returned directly to the blending operation without further processing by passing the reactor gases through a condenser with condensing surfaces maintained appreciably below the melting point of urea, in the range of 115° C. to 130° C.

Under some circumstances, such as when preparing the reactor feed by blending with aqueous urea solutions, it is convenient to recover urea values from the reactor gases by contacting the gases with a hot aqueous urea solution in conventional scrubbing equipment. It has been found that when the reactor gases are scrubbed with aqueous urea solution at temperatures in the range of 70–100° C., it is possible to collect the urea values without condensation of an appreciable portion of the water content of the reactor gases. At the same time, it has been found that the conversion of urea values to ammonium cyanate, ammonium carbamate and ammonium carbonate, which occurs in solid condensate systems below 100° C., is there avoided.

The reaction mixture is maintained in the form of small granules by blending about 65 to 85 or more parts of small granules obtained from the process with about 35 to 15 or less parts of fresh urea, charging the granular blend into the reaction vessel, and agitating the granules sufficiently to prevent them from sticking while the urea passes from a clear thin liquid through a viscous plastic stage into the hard solid end product of the pyrolysis. The agitation necessary to prevent granule adhesion in the process depends on the method used for blending the urea and the granules of pyrolysis product.

The granules used in the process should preferably be in the average particle size range of from $\frac{1}{16}$ inch to $\frac{1}{2}$ inch in diameter to get optimum results, although somewhat larger granules can be used.

Most preferably, the urea is blended with the hot crude cyanuric acid granules by spraying a portion of the hot discharge from the reaction with commercial aqueous urea solution (72% solution), preferably increased in strength by addition of overhead condensate, using about 35 or less parts by dry weight of urea to 65 or more parts by weight of crude cyanuric acid granules. The heat in the granules evaporates the water, and there results crude cyanuric acid granules, essentially impregnated with urea for about one-third or more of the diameter of the granules. For economic reasons, it is desirable not to exceed 85 parts by weight crude cyanuric acid granules to 15 parts by weight urea.

Another method of blending the reaction product with urea is to spray molten urea onto the hot reaction product while intensively blending the batch as in a pug mill, or a sigma or ribbon blender. Intensive blending is essential in order to prevent sticking from taking place, and conversion of the granules to balls. The maximum amount of molten urea that can be sprayed on without difficulty is about 25 urea to 75 crude cyanuric acid granules; below 15 parts urea to 85 crude cyanuric acid the process is less desirable economically. The product consists essentially of granules of crude cyanuric acid impregnated and coated with partially pyrolyzed urea; the impregnation is less deep than with the granules made with aqueous urea.

Regardless of which method is used to prepare the granules, in the optimum composition range, which lies at from 25 urea to 75 crude cyanuric acid to 20 urea to 80 crude cyanuric acid, this new composition of matter can be heated above the melting point of urea with such slight stickiness resulting that so long as the granules are kept moving they will not adhere to each other, and the conversion of urea to cyanuric acid proceeds evenly and smoothly under the conditions of this invention. With this composition the reaction can be carried on in a variety of types of reactors, including fluid bed reactors, Herreschoff furnaces, pug mills, ribbon of screw-type blenders, and the like. In a rotary kiln the peripheral speed may be varied over a wide range as dictated by other kiln requirements without regard for the problems of sticking and scaling.

When the composition prepared by blending aqueous urea with hot, crude cyanuric acid contains 35 urea to 65 crude cyanuric acid, control of agitation is essential to prevent sticking at some point in the pyrolysis. Agitation by moving a heat transfer surface (as in a rotary kiln) past the bed of granules at a rate of about 150 to 500 inches per minute will prevent any sticking from occurring, and will preserve the granular character of the reaction mixture. When higher proportions of urea are used than 35 to 65, control of kiln operating conditions to prevent sticking of the granules becomes too difficult for ordinary commercial operation, and so such compositions should preferably not be used.

When operating the process under optimum conditions, the aqueous urea is sprayed onto three times its anhydrous weight of hot granules of crude cyanuric acid in an agitated mixer such as a pug mill, there being just sufficient heat retained in this amount of crude product to evaporate the water in this amount of commercial aqueous urea without adding any heat. The remainder of the crude cyanuric acid which is not blended with aqueous urea is further treated to recover the desired cyanuric acid.

When molten urea is added to three times its weight of hot granules of crude cyanuric acid, the heat retained in the crude product is sufficient to convert a portion of the urea to biuret and cyanuric acid, so that partial pyrolysis of the urea occurs during the blending operation. More than 50% of the urea can be converted to cyanuric acid or its cogeners under these conditions, and the granular blend charged to the calciner contains as little as 10% unconverted urea and 90% of a mixture of crude cyanuric acid and partially pyrolyzed urea. When 15% of molten urea is sprayed onto 85% of hot kiln spill, the granules may contain no more than 5% unconverted urea. This permits an additional thermal economy in the over-all urea conversion process.

Blending can be done by simple mixing of crystalline urea with the cooled reaction product, and this mixture can be fed into the reaction vessel. With such a feed, agitation control becomes important, since the urea, on going through the viscous plastic state, can cause balling of the granules by making them adhere to one another. In general, the agitation produced in a rotary kiln, in which the heat transfer surface goes past the tumbling bed of pellets at between 150 and 400 lineal inches per minute, is sufficient to prevent loss of the granular character of the bed.

In blending crystalline urea with granules, the maximum ratio of urea to granules which can be used in plant practice is about 30 urea to 70 crude cyanuric acid granules. Above this ratio, sticking and balling occur in the reaction zone to a sufficient extent to interfere with continuous operation, even when operating conditions are carefully controlled.

The process, in general, operates to cause fines to grow in size. With aqueous urea and molten urea feed to the blending operation, the granules charged to the reactor are generally low in fines. The product is also low in fines and tends to maintain the preferred size range through many cycles of blending and pyrolysis. With crystalline urea feed to the blending operation, the reactor feed is higher in fines and there is some agglomeration and formation of a small amount of oversize in the reactor product. This oversize should not be fed directly to the blending operation if optimum process operation is desired. Because of the larger quantity of fines in the crystalline urea blend, optimum conditions for reactor operation are slightly different from those with the aqueous urea and molten urea blends.

In handling mixtures of crystalline urea and granules in a rotary kiln as distinguished from impregnated granules, it is essential that the kiln wall be not too hot at the feed end of the kiln to prevent scaling of the walls. With this type of feed the kilns are heated less strongly at the feed end than with impregnated granular feed, so that the preferred maximum feed end bed temperature is about 180° C. With the impregnated and coated granular feed of this invention, there is no critical upper limit on the bed temperature at the feed end of the kiln except that required to minimize volatilization of urea and overloading of the recovery system. It is also, in general, unnecessary to provide scrapers or other mechanical devices when operating with a feed consisting of impregnated and coated granules but, with a feed comprising a blend of crude, granular product and crystal urea, the use of a scraping device permits a wider range of operating conditions.

The residence time necessary in the practice of the process depends to a considerable extent on the temperature used, and the temperature profile in the equipment used. In a rotary kiln, for example, which is being uniformly heated, the feed end is being continuously cooled by the addition of the feed material, and heat is absorbed in the pyrolysis, so that the temperature will rise continuously toward the discharge end of the kiln. Immediately after the granular feed enters the reactor, it passes through a sticky stage where scaling of the walls or agglomeration of the granular bed may occur. This stage occurs in the temperature range below about 200° C. The time required to heat the reacting mixture up through this sticky zone will vary slightly depending on the method of preparing the granular feed but is not critical as long as the conditions of feed preparation and reactor operation herein described are observed.

In general, it is necessary to provide sufficient total residence time in a reactor for the pyrolysis of urea to proceed substantially to completion. Total residence times of about 40 minutes suffice if the final temperature attained by the reacting material is 230° C.; for a 250° C. final temperature, 15 minutes total residence time is generally enough. The minimum total residence time to accomplish substantially complete conversion of urea to crude cyanuric acid is about 7 minutes at 300° C. final temperature. The preferred final temperature is about 230 to 300° C., although the process can be operated up to about 375° C. before overhead losses become undesirably high. When operating at a final temperature of 300° C. or above, it is preferable to keep the total residence time as short as possible, but at lower final temperatures, residence times in excess of those needed for complete conversion to crude cyanuric acid do not impose serious problems in recovering urea values from the off gases.

In working up the kiln spill, from either form of the present invention, substantially pure cyanuric acid is obtained by subjecting the kiln produced cyanuric acid (containing salts and amides thereof as impurities or co-products) to digestion with a hot dilute aqueous strong acid. The process employs no catalyst for the urea-cyanuric conversion, so consequently there is no catalyst to be washed out; instead of washing away the basic organic materials formed along with cyanuric acid in the thermal decomposition of urea (which basic materials are largely amides of cyanuric acid), the crude kiln product is heated (after grinding, if necessary, to reduce particle size) with a dilute aqueous solution of a strong acid, which treatment results in the selective hydrolysis of these basic acid-soluble amides to additional cyanuric acid.

Almost any strong acid may be used for this digestion step, such as hydrochloric, hydrobromic, sulfuric, nitric or phosphoric acids. Organic acids such as alkane or aryl sulfonic or phosphonic acids may also be employed for this digestion process, but possess no advantages for this service to offset their much greater cost; accordingly, they are not included in the preferred class of digestion agents. Acid concentrations of from about one to about 25 percent are preferred for the hydrolysis-digestion treatment, with concentrations of from about 3% to 15% being most preferred. While it is possible to conduct the digestion at atmospheric pressure, superatmospheric pressures of up to 100 pounds per square inch may be employed; operation at superatmospheric pressure permits digestion at somewhat higher temperatures than are practical with atmospheric pressure digestion, and accordingly shortens the time required. Time and temperature of treatment are not extremely critical, but are interrelated; in general, the use of higher digestion temperatures permits employment of shorter treatment times. The digestion may be conducted at approximately the atmospheric pressure boiling point of the digestion acid used, for a period of from about one hour to about ten hours.

The effect of the acid digestion treatment is two-fold. When the kiln produced cyanuric acid is subjected to digestion with hot dilute strong acid, probably the first thing that occurs is that all materials readily soluble in the dilute strong acid are dissolved out of the solid. As a consequence of this, the cyanuric acid percentage content of the undissolved material is immediately improved; i.e., the improvement in purity is immediate. In addition to this immediate effect on product purity, there is a slower increase in the amount of cyanuric acid present, apparently due to the selective hydrolysis of acid-soluble cyanuric acid amides to form additional cyanuric acid.

It has been found that the cyanuric acid refined and obtained by this digestion treatment has a very low ammonia content (less than 0.1%), and is entirely suitable for chlorination. Kiln produced cyanuric acid often contains more than 1% ammonia; such an ammonia content renders the product unsuitable for chlorination. ("Ammonia content" as used herein, includes both free ammonia and ammonia present as ammonium salts; it does not include ammonia combined as amide groupings.)

For reasons of economy and convenience, hydrochloric and sulfuric acids are the preferred acids for the digestion refining of crude cyanuric acid, with hydrochloric acid the most preferred. The same batch of digestion acid may be used for successive batches of kiln-made cyanuric acid. Under such conditions of use, of course, there will be a build-up of ammonium salts which may be separated by known means. From time to time fresh acid may be added to replace that neutralized by ammonia; by thus restoring from time to time the digestion acid to its original concentration, and removing the ammonium salts formed in the digestion treatment, the digestion acid may be used repeatedly. This re-use of the digestion acid has the added advantage of avoiding loss of unhydrolyzed acid-soluble cyanuric acid amides which might occur if the digestion acid were discarded after each use. In some instances, it may be desirable to conduct the acid digestion treatment on a continuous basis, with continuous addition of crude cyanuric acid and make up digestion acid, continuous or intermittent separation of ammonium salts formed in the digestion, and continuous withdrawal of digested and purified cyanuric acid.

Although, as stated above, time and temperature of the acid digestion and the concentration of the acid used are not extremely critical, it has been found that a digestion temperature of 75° C. gives results inferior to those obtained at the boiling point. It has been found that hydrochloric acid of 0.1 N concentration is relatively ineffectual in upgrading crude kiln produced cyanuric acid but that concentrations of 1 N and higher are quite effective, with concentrations 3 N and higher giving the best results. Digestion times of one hour have been found to give commercially significant improvement in cyanuric acid recovery from 20 mesh and finer crude cyanuric acid, and increasingly greater recoveries are obtained up to about four hour digestion times. Increasing digestion time beyond about four hours has not been found to give commercially significant improvement in cyanuric acid recovery, however. Digestion times of less than one hour sometimes leave an appreciable portion of the potentially recoverable cyanuric acid in the form of acid-soluble amides.

The following examples are given by way of illustration only, and it is understood that the invention is not limited thereto.

Figure 1:
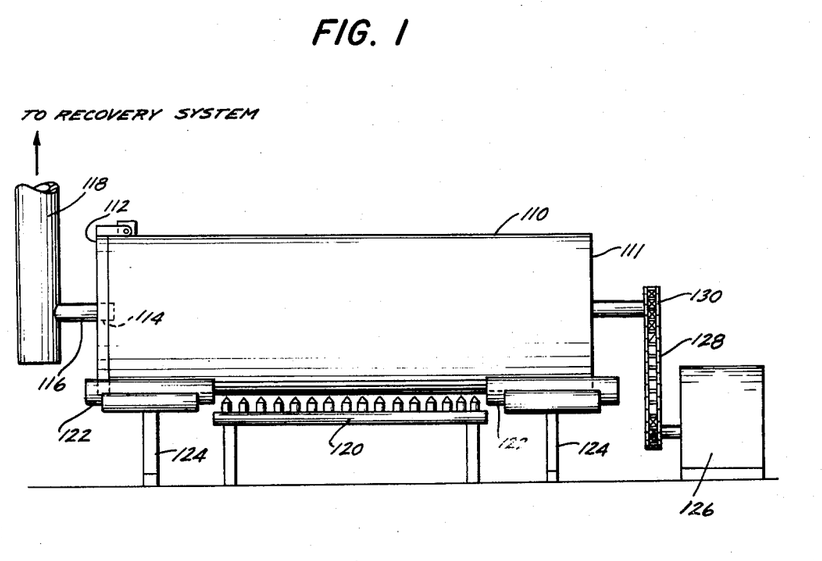
Fig. 1 illustrates, schematically, apparatus useful in producing the invention with a straight urea feed.

Examples I to VIII were run in equipment essentially like that shown in Fig. 1. The kiln consists of a stainless steel cylinder 110 about 72 inches long and 16 inches in diameter. One end 111 is closed; the other end carries a removable head 112 having a two inch hole 114 in its center. A pipe 116 connects this hole to an exhaust 118, which leads off to a scrubbing system for the vent gases, in which system urea values can be recovered. The kiln is heated on the bottom by a gas burner 120. It rotates on pairs of rollers 122 carried on supports 124. A motor 126 rotates the kiln through a chain 128, acting on a sprocket 130 carried by the kiln.

*Example I*

One hundred pounds of urea are placed in the kiln, and after replacing the removable head, the kiln is caused to rotate about its axis at a speed of 10 r.p.m., corresponding to a peripheral speed of about 500 inches per minute. Heating is now commenced by gas flames directed against the lower side of the kiln. Heating and rotation are continued for 47 minutes until the inner surfaces temperature, as indicated by a thermocouple dragging in the bed of reacting material, reaches 270° C. Heat is cut off at this point, and rotation continued for about 5 minutes, when the temperature reaches a maximum of 286° C. The kiln is then opened and its contents removed. The product weighs 58 pounds and assays 58.0% cyanuric acid. It is a colorless, granular solid consisting largely of chunks more than five inches in diameter.

In this example, the heating rate is too rapid to give the desirable end product, and the chunks, on analysis, show considerably higher assay of cyanuric acid on the surface of the chunks than in their interiors. Furthermore, the interiors contain less material convertible to cyanuric acid on hydrolysis, so that over-all yields are substantially less than for granular products with the same percentage conversion to cyanuric acid.

*Example II*

This is similar to Example I, and is carried out in the same equipment. The kiln rotates at 5 r.p.m., equivalent to a peripheral speed of 250 inches per minute. After 51 minutes of heating, the temperature reaches 270° C., and after dicontinuance of heating, a maximum temperature of 287° C. is reached. The product consists largely of pellets ranging in size from ⅛ inch to 2 inches, but a part of the product remains on the kiln walls as an adherent, hard-to-remove scale; the entire product weighs 58 pounds and assays 60.5% cyanuric acid.

It will be noted that as compared with Example I, the kiln speed is half and the heating rate is just a bit slower. It will be noted that despite the scale, which always represents a loss of yield because of higher volatilization, the product is obtained in higher yield than in Example I, besides being easier to handle.

*Example III*

For this example, the same equipment and general procedure are used as in Example I. The kiln rotates at 1.5 r.p.m., equivalent to a peripheral speed of about 75 inches per minute. Sixty-four minutes of heating is required to heat kiln and contents to 320° C. Thereafter the temperature rises to a maximum of 324° C. The product weighs 55 pounds and assays 64.4% cyanuric acid; there is a small amount of easily removable scale on the kiln wall, but the bulk of the material consists of small pellets with a few chunks up to 2 inches in diameter.

At this lower speed and slighlty lower heating rate, conversion to granular material is substantially more complete. Conversion to cyanuric acid is more complete, although more urea has been volatilized by the higher temperature.

It should be noted that over-all conversion to cyanuric acid and its amides (which are recoverable as cyanuric acid by acid hydrolysis) is much more complete than indicated by the yields; when worked up (see Example X), the cyanuric acid derived from this product represents almost 89% of the total kiln product. This sort of result is typical for granular products.

*Example IV*

This example is also generally similar to Example I. Rotation is at a rate of 5 r.p.m., equivalent to a peripheral speed of 250 inches per minute. Seventy-four minutes of heating are required to heat the kiln and its contents to 345° C., after which the temperature rises without additional heating to a maximum of 361° C. In this case, the kiln walls are completely clean, and the product is obtained in the form of small pellets about ⅛ inch in diameter; the product weighs 52 pounds, assaying 63.6% cyanuric acid. Here, the effect of low heating rate and moderate speed has resulted in complete conversion to the granular state. More urea has been volatilized and must be recovered; above this temperature, yields drop sharply, as can be noted from Example V.

*Example V*

This also employs the equipment and general procedure of Example I. Rotational speed is 5 r.p.m., and 135 minutes of heating are required to raise the temperature to 395° C. The yield is 37 pounds of fine pellets assaying 61.6% cyanuric acid. It is believed that the relatively poor yield in this example is due to volatilization losses of cyanuric acid at the extremely high temperature employed.

*Example VI*

This also employs the equipment and general procedure of Example I, except that 135 pounds of urea were charged. The kiln rotates at 22 r.p.m., equivalent to a peripheral speed of 1,100 inches per minute. After 63 minutes of heating, the temperature rises without additional heating to a maximum of 281° C. The kiln walls are completely clean. The product, which weighs 70.5 pounds and assays 57.6% cyanuric acid, consists of irregular lumps and chunks up to 12 inches in diameter.

This illustrates the effect of high speed on balling and lumping, even at moderate heating rates. Compared with Example II, both the over-all yield and the percentage of conversion are adversely affected by the lumping. As in Example I, conversion was much better on the outside of the big balls than in the interiors, resulting in losses, and bad effects on further processing.

*Example VII*

This example is also generally similar to Example I. The kiln rotates at 20 r.p.m., equivalent to a peripheral speed of 1,000 inches per minute. After 44 minutes of heating, the temperature of the kiln and contents reaches 274° C., after which the temperature rises without additional heating to a maximum of 293° C. A small part of the product adheres to the walls as a hard-to-remove scale. The whole product weighs 53.0 pounds and assays 56.8% cyanuric acid. It consists of large irregular, hard lumps.

Here we see the effect of a rapid heating rate at high speed; it will be noted that the lumps show the same lower conversions obtained in Example VI.

*Example VIII*

This example also employs the equipment and general procedure of Example I. The kiln rotates at 20 r.p.m., equivalent to a peripheral speed of 1,000 inches per minute. The heating rate is much lower than that used in the experiment of Example VII, however, so that 115 minutes are required for the temperature of the kiln and contents to reach 270° C. The temperature does not rise beyond 270° C. after the heating is stopped. A small part of the product adheres to the walls as a hard-to-remove scale. The remainder consists of small pellets ranging up to about 2 inches in diameter.

This example shows how a slow heating rate will cause pellet formation under conditions where a rapid heating rate causes balling and lumping.

The following example illustrates continuous operation of the process using urea feed. Because of the necessity of breaking up the balls formed by the action of the molten urea at the feed end, substantial residence times were necessary.

*Example IX*

For this example, a small laboratory kiln, 8 inches long and seven and three-eighths inches in diameter, was used, with one end closed and with the other end having a four inch diameter hole in its center to permit of feed and overflow. The kiln was filled up to the bottom of the hole with crude cyanuric acid granules prepared previously, of ¹⁄₁₆ to ¼ inch average particle size. The kiln was rotated at 10.25 r.p.m. (equal to 230 inches per minute peripheral speed), and the bed heated to 320° C., as measured in the bed of granules. Molten urea was added at the rate of about six grams per minute to the tumbling pellets, and the product overflowed from the open end of the kiln at a rate varying from 50 to 125 grams per hour; there was also a considerable evolution of vapors and white fumes. The pellets assayed 71% to 85% cyanuric acid, the balance largely ammelide. The overhead losses were very high, due mainly to long residence times occasioned by the necessity for very slow feed under the conditions of test.

The products of the pyrolysis can be worked up into commercially acceptable cyanuric acid by the procedure shown in the following example.

*Example X*

A portion of the product of Example III is pulverized to give a product 99% of which will pass through a 20 mesh screen. 25 grams of the pulverized material is then placed in a 250 ml. glass flask provided with a stirrer and reflux condenser and containing 65 ml. of 7% hydrochloric acid. Stirring and heating are commenced, and the temperature is raised as rapidly as convenient to about 103° C., at which temperature boiling occurs. After four hours of digestion at the boiling point, the mixture is cooled to about 40° C. and filtered. The filter cake is washed with about 50 ml. of cold water and dried in an oven at 100° C. The dried product is found to weigh 22.34 grams and assays 100% cyanuric acid. It is found to contain less than 0.1% $NH_3$. Since the starting material for this digestion contains only 16.10 g. of cyanuric acid, the digestion process is seen to result in a 138% recovery of cyanuric acid from the crude kiln product; the better than 100% recovery is believed to be due to selective hydrolysis of cyanuric amides to cyanuric acid. The over-all yield of pure cyanuric acid based on urea is 68.5% of theoretical.

In operating with recycled granules of crude cyanuric acid mixed with urea, the apparatus shown in Figs. 2 to 5 is employed.

Figures 2, 3:
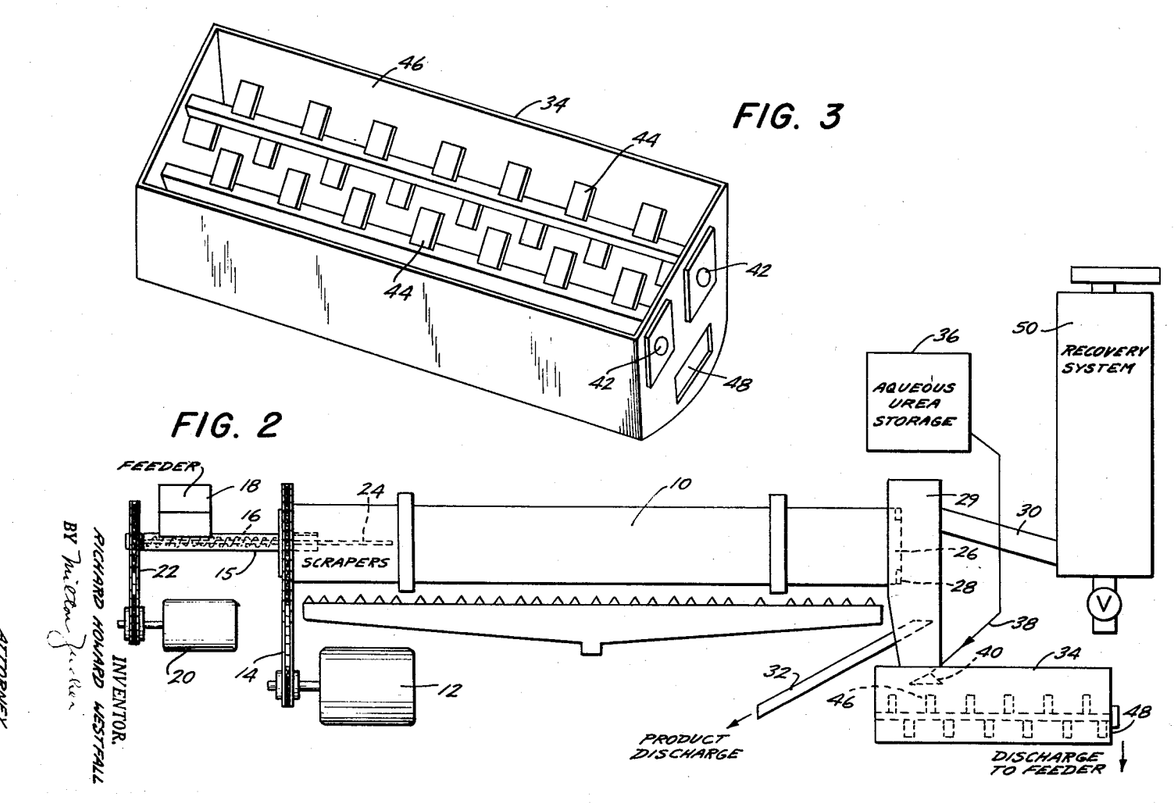
Fig. 2 is a schematic illustration of a plant for recycling granules to get faster conversion.
Fig. 3 is a perspective view, with the cover off, of a pug mill useful in treating kiln spill with urea.

A slightly inclined kiln 10 is provided, about 6 to 8 times as long as in diameter; it is driven by a motor 12 through a chain drive 14. At the upper feed end of the kiln, there is provided a screw feeder 16 fed by a hopper 18; the feeder is driven by a motor 20 through a chain drive 22. A scraper 24 is keyed to the stationary housing 15 of the screw feeder 16 and the rotation of the kiln against the stationary scraper provides additional agitation at the feed end of the kiln.

At the discharge end 26 of the kiln, a small dam 28 is provided to control residence time and heat transfer efficiency in the kiln. The kiln end 26 is mounted in an exhaust pipe 29 which vents gases to a recovery system through a vent 30. At the bottom of the pipe 29 are mounted a product discharge tube 32 and a mixer 34, with openings proportioned as desired to bleed off 11% to 20% of the discharge to end product, and the rest to the mixer. A tank 36 for urea solution (standard commercial solution preferably increased in strength by addition of overhead condensate) is arranged above the mixer to discharge urea as desired into the mixer 34 through a pipe 38; a spray head 40 distributes the solution onto the hot spill in the mixer 34 shown in Figure 3.

The mixer 34 is a standard pug mill, and comprises a pair of shafts 42 rotating in opposite directions, with staggered blades 44 on the shafts which act to simultaneously mix the material and convey it from the feed end 46, where the kiln spill drops and is sprayed with the aqueous urea, to a discharge port 48 from whence the impregnated granules can be fed directly to the feed hopper 18.

There is a tendency for the overhead gases to condense out, on the walls of the exhaust pipe 29 and vent 30, as a solid condensate consisting mainly of cyanuric acid, if the wall temperatures lie in the range of about 190–220° C. When these wall temperatures are maintained above about 220° C., there is little or no condensation of solid material in the gas exhaust system until the gases reach the recovery system 50. In the recovery system shown in Fig. 4, the condensing surfaces of the condenser 52 are maintained at a temperature of 115–130° C. by a jacket 54 in which hot oil is circulated. Surprisingly, at these low temperatures, below the melting point of urea, a liquid condensate collects on the side of the condenser 52, consisting mainly of urea with some biuret and very small quantities of cyanuric acid amides. The uncondensed vent gases pass out through a vent 56. The liquid running down the sides collects at the bottom of the condenser 52 and is removed through the valve 58. It is then added to the aqueous urea storage tank, where it serves to raise the strength of the aqueous urea.

Figures 4, 5:
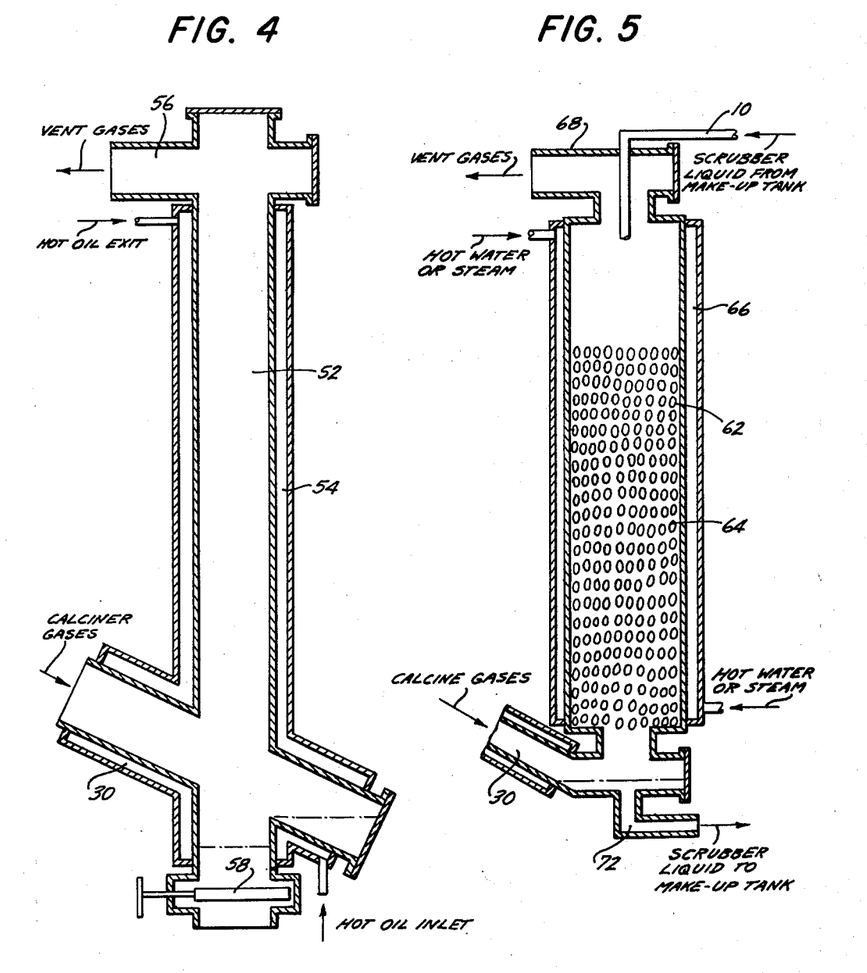
Fig. 4 is a schematic cross section of one form of urea recovery equipment.
Fig. 5 is a schematic cross section of a second form of urea recovery equipment.

If the temperature of the condensate is raised above 130° C., recovery of urea values is reduced because of the rapid increase in vapor pressure of urea with temperature above 130° C.; if the temperature is reduced below 115° C., the condensate freezes on the condensing surface, interfering with proper operation, and decreasing urea recovery because of partial conversion to ammonium cyanate and ammonium carbamate.

In the alternate recovery equipment shown in Fig. 5, the reactor gases are passed up through a scrubber 62 packed with Raschig rings 64. An aqueous urea solution is circulated through the scrubber through inlet 70 and outlet 72 and is maintained at a temperature in the range of 70–100° C. by jacket 66. A portion of this urea solution is continuously added to the urea storage tank 36. The temperature and concentration of the scrubbing solution are adjusted at 70 to 100° C. to prevent the condensation of water vapor from the reactor gases.

Examples of the process using aqueous urea impregnated granules are as follows:

Example XI

A kiln 1 foot in diameter by 8 feet in length is used, essentially like that shown in the drawing with a 4 inch dam at the discharge end using the aqueous scrubber of Fig. 5. Hot kiln spill, almost entirely granules $\frac{1}{16}$ to $\frac{1}{2}$ inch in diameter, is dropped into the pug mill at 255° C., and sprayed with urea solution, to get granules of crude cyanuric acid saturated to about one-third of the granule depth, with urea. The hot impregnated granules are fed directly back into the kiln.

The kiln is operated continuously over a three-hour period, at a speed of 7 r.p.m. and with a slope of ¼ inch per foot. During this time, 177.5 pounds of urea are fed into the system, onto about 670 pounds of crude product from the kiln, (urea-crude cyanuric acid ratio of 21 to 79) while about 97 pounds of crude cyanuric acid are delivered to processing into commercially pure cyanuric acid, using the process described in Example XVII.

The reactor gases are passed through a column packed with Raschig rings, through which is circulated a 72% aqueous urea solution maintained at 85–90° C. Of the urea fed into the system, 16.6% is recovered in this scrubber, as measured by increase in content of urea plus small amounts of biuret and cyanuric acid.

The kiln product contains 79.2% cyanuric acid and 19.5% ammelide. On acid digestion, the ammelide converts almost quantitatively into cyanuric acid, and residual impurities wash out, and the product resulting is almost 100% pure cyanuric acid. Based on the urea consumed in the process, the yield of pure cyanuric acid is about 88.5%; the losses are occasioned partially by loss of solubles in the acid conversion, but mainly by breakdown of the urea values to $CO_2$. Upon completion of the run, the kiln walls are found to be free of adhering material, even at the feed end. This is remarkable in view of the sticky nature of urea itself at the temperatures prevailing in the feed end of the kiln.

The feed rate of the urea impregnated crude cyanuric acid is about 5.4 pounds per minute, and the kiln holds a total of 66 pounds, making the holding time about 12 minutes. At the feed end, temperatures are about 180° C.; as the charge moves into the kiln, it reaches 235° C. after 4 minutes; while moving down the kiln, it rises slightly to 238° C. and remains at that temperature for about 4 minutes. In the remaining 4 minutes, it rises to 255° C., at which temperature it discharges from the kiln.

As the product analysis shown above indicates, conversion of urea to crude cyanuric acid is essentially complete.

Example XII

This example is run in the continuous kiln of Example XI operating at 7 r.p.m. except that the dam is only 2 inches high, resulting in a kiln hold up of only 17.4 pounds. The kiln is operated continuously over a 3.5 hour period, during which time a granular mixture consisting of 76.5% crude cyanuric acid and 24.5% urea, made by blending kiln discharge with aqueous urea, is fed at an average rate of 3.74 pounds per minute. Discharge temperature is about 345° C., but retention time only 4.7 minutes. Analysis of product samples shows urea plus biuret contents ranging from 0.4% up to 10.4%, indicating incomplete conversion of urea to crude cyanuric acid during at least part of the operation.

Example XIII

This example is run in the kiln of Example XI, using the condenser of Fig. 4, the kiln having a 4 inch high dam, and operating at 7 r.p.m., for 49 hours. The kiln is initially charged with granular product from a previous run. Granular feed prepared by spraying 72% aqueous urea increased in strength by the molten condensate from the 125° C. condenser, is fed to the kiln at an average rate of 4.3 pounds per hour. Hold up in the kiln is 64 pounds, and average residence time 15 minutes. Average product discharge temperature is 304° C. The granular product discharging from the kiln has an average composition of 78.0% cyanuric acid and 21.4% ammelide, indicating essentially complete conversion of the urea to crude cyanuric acid. Temperature of the gas in the exhaust pipe 29 is about 320° C. because the exhaust pipe is heated to slightly above kiln temperature by heat from the burner gases. The gas condenser walls are maintained at 120–130° C. by circulating hot oil through a jacket and the molten condensate is returned to the hot aqueous urea feed to the blender. During the total time of operation, 9,520 pounds of crude cyanuric acid are discharged from the kiln. Of this, 1,075 pounds are removed as net product, and the remainder is blended with 2,416 pounds of urea added as hot aqueous urea solution strengthened with condensate from the recovery system. The granular feed to the kiln thus comprises 80% crude cyanuric acid and 20% urea.

*Example XIV*

This example is run in the kiln as in Example XIII, having a 4 inch dam, and operating at 7 r.p.m. A granular feed consisting of 78% crude cyanuric acid and 22% urea, prepared by blending hot kiln discharge with 72% aqueous urea feed in a pug mill, is fed to the kiln at a rate of 4.06 pounds per minute. The kiln is operated continuously over a 4 hour period, has a 63 pound hold up, and retention time of 15.5 minutes. Discharge temperature is 372° C. The crude product analyzes 79.1% cyanuric acid and 20.1% ammelide. Of the urea fed to the process, 14.2% is recovered in the hot condenser. Conversion of urea consumed to cyanuric acid and materials convertible to cyanuric acid by acid digestion is 80.8%. This is somewhat lower than the yields obtained by operating in the preferred lower temperature range. Loading of the urea condenser is high, but performance is good. Of the urea fed to the process, 70.0% is converted to cyanuric acid and materials convertible to it, 10.8% is converted to $CO_2$ or is unaccounted for, 14.2% is recovered in the condenser with walls held at about 125° C., and 5% is in the vent gases from the condenser.

In this example, overhead losses can be cut down by reducing the retention time to 6 minutes, while conversion remains substantially the same.

*Example XV.—Molten urea impregnated granules*

Instead of impregnating the crude cyanuric acid granules with aqueous urea, molten urea may be used as the spray in preparing the novel, granular impregnated mixture for feeding to the reactor.

A sigma blade mixer is used, and 25 parts by weight of molten urea at 150° C. are sprayed onto 75 parts by weight of hot kiln spill at 275° C. The mixture is stirred for 3 minutes, the final temperature being 175° C. The resultant product consists of granules of crude cyanuric acid impregnated and coated with a partially pyrolyzed urea, and contains 88.5% cyanuric acid plus ammelide, 9.5% urea, and 2% biuret. Thus, a considerable part of the urea conversion to cyanuric acid actually takes place during the hot blending step.

This granular material, when fed into a kiln operated exactly like in Example XI, gives comparable results to that obtained with the feed material of Example XI.

When it is attempted to spray larger proportions than 25 parts of urea to 75 parts of crude cyanuric acid, the urea ratio apparently exceeds what can be absorbed by the granules, and sticking occurs during the blending step.

*Example XVI.—Urea-granule mix*

This example illustrates the use of a mixture of discrete particles of crystalline urea with the granules.

The kiln of the drawings, inclined ¼ inch per foot, is operated in this example at 7 r.p.m., using a 2 inch dam and a condenser. A mixture of 116.5 pounds of crystalline urea is made with 349.5 pounds of crude cyanuric acid granules (ratio 25/75) screened to pass ¼ inch. The mixture is fed into the kiln over a three hour period at a rate of 2.44 pounds per minute. The kiln is heated so that the bed temperature at the feed end is 170° C., at the discharge end 275° C. Average holding time is about 9.4 minutes.

The kiln product contains 80.0% cyanuric acid and 19.5% ammelide; it is converted on acid digestion to practically 100% cyanuric acid. About 10% of the urea charged is recovered from the vent gases. Based on urea consumed, the over-all recovery of cyanuric acid after hydrolysis is 81.5%.

The hydrolysis of the high-yield products obtained by recycling crude cyanuric acid granules mixed with urea is somewhat easier than with the products obtained with straight urea feed. The procedure described in the following example is typical of one useful method of hydrolysis of the crude reactor product with high-yield crude.

*Example XVII*

Crude cyanuric acid containing 82.8% cyanuric acid and 17.2% ammelide is mixed with a volume of 5.0 N-sulfuric acid sufficient to provide 4.9 mols of sulfuric acid for each mol of ammelide, and heated in a closed vessel at 140° C. for two hours. The vessel is cooled and solid product removed and filtered. It corresponds in weight to a 98.5% recovery of both the cyanuric acid and ammelide contents of the crude cyanuric acid, and consists of 99.6% cyanuric acid and 0.4% ammelide. It is suitable for chlorination.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

This application is a continuation-in-part of applications Serial No. 614,357, filed October 8, 1956, Serial No. 732,865, filed May 5, 1958 and Serial No. 741,080, filed June 10, 1958, all now abandoned.

What is claimed is:

1. A process for converting urea to a reaction product consisting largely of cyanuric acid and ammelide and convertible to commercially pure cyanuric acid by acid hydrolysis, which comprises heating a mass of urea to a temperature in the range of 240° C. to 360° C. at such a rate that the urea is molten and then deammoniated through a viscous plastic state to a hard solid state while continuously tumbling the reaction mass at such a rate of speed that the material largely converts into free-flowing granules of solid crude cyanuric acid, and removing the crude cyanuric acid from the heat.

2. A process for converting urea to a reaction product consisting largely of cyanuric acid and ammelide and convertible to commercially pure cyanuric acid by acid hydrolysis, which comprises heating a mass of urea to a temperature in the range of 240° C. to 360° C. over a period of 50 to 200 minutes whereby the urea is molten and then deammoniated through a viscous plastic state to a hard solid state while continuously tumbling the reaction mass at such a rate of speed that the material largely converts into free-flowing granules of solid crude cyanuric acid, and removing the crude cyanuric acid from the heat.

3. A process for converting urea to a reaction product consisting largely of cyanuric acid and ammelide and convertible to commercially pure cyanuric acid by acid hydrolysis, which comprises heating a mass of urea to a temperature in the range of 240° C. to 360° C. at such a rate that the urea is molten and then deammoniated through a viscous plastic state to a hard solid state while continuously tumbling the reaction mass past a heat transfer surface at a speed of 50 to 1,000 inches per minute whereby the material largely converts into free-flowing granules of solid crude cyanuric acid, and removing the crude cyanuric acid from the heat.

4. A process for converting urea to a reaction product consisting largely of cyanuric acid and ammelide and convertible to commercially pure cyanuric acid by acid hydrolysis, which comprises heating a mass of urea to a temperature in the range of 240° C. to 360° C. over a period of 50 to 200 minutes whereby the urea is molten and then deammoniated through a viscous plastic state to a hard solid state while continuously tumbling the reaction mass past a heat transfer surface at a speed of 50 to 1,000 inches per minute whereby the material largely converts into free-flowing granules of solid crude cyanuric acid, and removing the crude cyanuric acid from the heat.

5. The process of claim 4, in which the temperature range is 280° C. to 340° C.

6. The process of claim 4, in which the tumbling rate approximates 250 inches per minute.

7. The process for converting urea to a free-flowing granular reaction product consisting largely of cyanuric acid and ammelide, and convertible by acid hydrolysis and washing to commercially pure cyanuric acid, which comprises mixing granules of such a reaction product with urea to obtain a free-flowing granular blend containing 5 to 35% of urea, feeding the free-flowing blend into a reaction zone heated to temperatures of 210 to 375° C. to deammoniate the urea through a viscous plastic state to a hard solid state, and moving it through the heated zone while continuously agitating the blend to preserve the granules in free-flowing form.

8. The process of claim 7, in which the granules move through the heated zone during a period of between 6 and 40 minutes.

9. The process for converting urea to a free-flowing granular reaction product consisting largely of cyanuric acid and ammelide, and convertible by acid hydrolysis and washing to commercially pure cyanuric acid, which comprises applying urea to free-flowing granules of such a reaction product to impregnate and coat the granules while agitating the granules to maintain them in free-flowing state, in sufficient quantity to produce granules containing 5 to 35% of urea, feeding the free flowing granules into a heated zone to raise their temperature to 210° C. to 375° C. to deammoniate the urea through a viscous plastic stage to a hard solid stage, and moving them through the heated zone while continuously agitating the granules to preserve them in free-flowing form.

10. The process of claim 9, in which the granules are in a particle size range of between 1/16 and 1/2 inch.

11. The process for converting urea to a free-flowing granular reaction product consisting largely of cyanuric acid and ammelide, and convertible by acid hydrolysis and washing to commercially pure cyanuric acid, which comprises blending 5 to 35% of urea and 95 to 65% of free-flowing granules of such a reaction product, to produce a free-flowing blend, moving the blend through a heated zone to raise its temperature to 210° to 375° C. to deammoniate the urea through a viscous plastic stage to a hard solid stage while continuously agitating the blend to preserve the granules in free-flowing form, discharging the granules as a free-flowing reaction product as defined above, blending a portion of the discharged granules with sufficient urea to give a blend containing 5 to 35% of urea, and refeeding the blend to the heated zone.

12. In the process of claim 11, the method of blending the granules with urea, which comprises cooling the granules and mixing them with sufficient crystalline urea to obtain a mixture containing from 15% to 30% of the urea.

13. In the process of claim 11, the method of blending the granules with urea, which comprises spraying molten urea onto the hot granules while maintaining them under intensive blending, the urea being added in a ratio of between 15 urea to 85 granules and 25 urea to 75 granules.

14. In the process of claim 11, the method of blending the granules with urea, which comprises spraying hot aqueous urea solution onto the hot granules discharged from the heated zone while agitating the mass to evaporate the water, the urea being present in a ratio of between 35 urea to 65 granules and 15 urea to 85 granules.

References Cited in the file of this patent

UNITED STATES PATENTS

| | | |
|---|---|---|
| 2,712,491 | Boatright | July 5, 1955 |
| 2,768,167 | Marzluff et al. | Oct. 23, 1956 |